(12) United States Patent
Cui

(10) Patent No.: US 12,478,798 B2
(45) Date of Patent: Nov. 25, 2025

(54) JAUNDICE DIAGNOSIS AND TREATMENT SYSTEM AND COMPUTER-READABLE STORAGE MEDIUM

(71) Applicant: BOE Technology Group Co., Ltd., Beijing (CN)

(72) Inventor: Yuanyuan Cui, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 766 days.

(21) Appl. No.: 17/782,998

(22) PCT Filed: May 13, 2021

(86) PCT No.: PCT/CN2021/093656
§ 371 (c)(1),
(2) Date: Jun. 7, 2022

(87) PCT Pub. No.: WO2021/244253
PCT Pub. Date: Dec. 9, 2021

(65) Prior Publication Data
US 2023/0001228 A1 Jan. 5, 2023

(30) Foreign Application Priority Data
Jun. 4, 2020 (CN) .................. 202010498707.5

(51) Int. Cl.
*A61B 5/145* (2006.01)
*A61B 5/00* (2006.01)
*A61N 5/06* (2006.01)

(52) U.S. Cl.
CPC ........ *A61N 5/0621* (2013.01); *A61B 5/14546* (2013.01); *A61B 5/7275* (2013.01); *A61B 2503/045* (2013.01)

(58) Field of Classification Search
None
See application file for complete search history.

(56) References Cited

U.S. PATENT DOCUMENTS

| | | | | |
|---|---|---|---|---|
| 2010/0174152 A1* | 7/2010 | Mcnair | ............... | G16H 50/50 600/301 |
| 2015/0359459 A1* | 12/2015 | Taylor | ............... | A61B 5/0077 600/477 |
| 2018/0243583 A1* | 8/2018 | Duggins | ............ | A61B 5/14546 |

FOREIGN PATENT DOCUMENTS

| | | |
|---|---|---|
| CN | 101703390 A | 5/2010 |
| CN | 101703390 B | 7/2012 |

(Continued)

OTHER PUBLICATIONS

Bhutani VK, Johnson L, Sivieri EM. Predictive ability of a predischarge hour-specific serum bilirubin for subsequent significant hyperbilirubinemia in healthy term and near-term newborns. Pediatrics. Jan. 1999;103(1):6-14. doi: 10.1542/peds.103.1.6. PMID: 9917432. (Year: 1999).*

(Continued)

*Primary Examiner* — Etsub D Berhanu
*Assistant Examiner* — Janki M Bava
(74) *Attorney, Agent, or Firm* — XSENSUS LLP

(57) ABSTRACT

A jaundice diagnosis and treatment system includes a control circuit, a bilirubin measurement assembly, a risk evaluation circuit and a display assembly, wherein the bilirubin measurement assembly is communicatively connected to the control circuit, and is used for measuring a bilirubin concentration of a newborn baby and transmitting the measured bilirubin concentration to the control circuit, so that the control circuit generates measurement data according to the measured bilirubin concentration; the risk evaluation circuit is communicatively connected to the control circuit, and is used for acquiring the measurement data from the control (Continued)

circuit and evaluating a pathologic jaundice risk level according to the measurement data; and the display assembly is connected to the control circuit, and is used for displaying the measurement data and/or the pathologic jaundice risk level under the control of the control circuit.

13 Claims, 8 Drawing Sheets

(56) References Cited

FOREIGN PATENT DOCUMENTS

| CN | 102861379 | A | | 1/2013 | |
| --- | --- | --- | --- | --- | --- |
| CN | 102861379 | B | | 5/2015 | |
| CN | 105943056 | | * | 5/2016 | ........... A61B 5/1455 |
| CN | 105943056 | A | | 9/2016 | |
| CN | 111493838 | A | | 8/2020 | |
| WO | 2019/070116 | A1 | | 4/2019 | |
| WO | WO2019206929 | | * | 10/2019 | ........... A61B 5/1455 |

OTHER PUBLICATIONS

F. Pineda-López et al., "Light blue led for bilirubin treatment in newborns: Automatic photherapy prototype," 2017 IEEE XXIV International Conference on Electronics, Electrical Engineering and Computing (INTERCON), Cusco, Peru, 2017, pp. 1-4, doi: 10.1109/INTERCON.2017.8079715. (Year: 2017).*

Newman TB, Liljestrand P, Escobar GJ. Combining Clinical Risk Factors With Serum Bilirubin Levels to Predict Hyperbilirubinemia in Newborns. Arch Pediatr Adolesc Med. 2005;159(2):113-119. doi:10.1001/archpedi.159.2.113 (Year: 2005).*

International Search Report and Written Opinion mailed on Jul. 30, 2021, in corresponding PCT/CN2021/093656, 4 pages.

* cited by examiner

Acquiring a birth time $T_B$ of the newborn, information on whether the newborn is full-term, and the detection data $(T_i, C_i)$ of the newborn, where $i$ is a natural number and is not greater than $N$, and is used to represent $i$-th bilirubin detection performed for the newborn; $N$ represents $N$-th bilirubin detection latest performed for the newborn; $T_i$ represents a time of the $i$-th bilirubin detection, and $C_i$ represents a bilirubin concentration of the $i$-th bilirubin detection ~~~ S210

According to the detection data $(T_N, C_N)$, determining whether an interval time $T_{N,B}$ between a detection time $T_N$ and the birth time $T_B$ is less than a first time threshold $T_{ref1}$, and determining whether the bilirubin concentration $C_N$ is greater than a first concentration threshold $C_{ref1}$, and generating first confirmation information when it is determined that the interval time $T_{N,B}$ is less than the first time threshold $T_{ref1}$ and the bilirubin concentration $C_N$ is greater than the first concentration threshold $C_{ref1}$ ~~~ S220

Determining whether the bilirubin concentration $C_N$ is greater than a second concentration threshold $C_{ref2}$ which is greater than the first concentration threshold $C_{ref1}$ according to the detection data $(T_N, C_N)$, where, when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, the first reference concentration $C_{ref21}$ is less than the second reference concentration $C_{ref22}$, and generating second confirmation information when it is determined that the bilirubin concentration $C_N$ is greater than the second concentration threshold $C_{ref2}$ ~~~ S230

Calculating a first concentration change rate $V_{N,N-1}$ according to the detection data $(T_N, C_N)$ and the detection data $(T_{N-1}, C_{N-1})$ when $N$ is greater than 1, where, $V_{N,N-1}=(C_N-C_{N-1})/(T_N-T_{N-1})$, and generating third confirmation information when the first concentration change rate $V_{N,N-1}$ is greater than a reference rate threshold $V_{ref1}$ ~~~ S240

Determining that the risk level of pathological jaundice is a high risk according to the first confirmation information, the second confirmation information or the third confirmation information ~~~ S250

FIG. 7

Generating first negative information when the interval time $T_{N,B}$ is not less than the first time threshold $T_{ref1}$ or the bilirubin concentration $C_N$ is not greater than the first concentration threshold $C_{ref1}$ — S310

Generating second negative information when the bilirubin concentration $C_N$ is not greater than the second concentration threshold $C_{ref2}$ — S320

Generating third negative information when the first concentration change rate $V_{N,N-1}$ is not greater than the reference rate threshold $V_{ref1}$ — S330

Calculating a first predicted concentration $C_{M1}$ when $N$ is greater than 1, where $C_{M1}=C_N+T_{M1}*(C_N-C_{N-1})/(T_N-T_{N-1})$, and generating fourth confirmation information when $C_{M1}$ is greater than a third concentration threshold $C_{ref3}$ — S340

When $N$ is greater than 2, calculating a second predicted concentration $C_{M2}$ where $C_{M2}=C_N+T_{M2}*(C_N-C_{N-1})/(T_N-T_{N-1})$, and calculating $V_{N-1,N-2}$ and comparing $V_{N,N-1}$ with $V_{N-1,N-2}$, where $V_{N-1,N-2}=(C_{N-1}-C_{N-2})/(T_{N-1}-T_{N-2})$, and generating fifth confirmation information when $C_{M2}$ is greater than a fourth concentration threshold $C_{ref4}$, and $V_{N,N-1}$ is greater than $V_{N-1,N-2}$ — S350

Determining that the risk level of pathological jaundice is a medium risk according to the first negative information, the second negative information and the third negative information, and according to the fourth confirmation information or the fifth confirmation information — S360

FIG. 8

Acquiring the detection data ($T_i$, $C_i$) of the newborn and the phototherapy parameter that has been applied to the newborn, where $i$ is a natural number and is not greater than $N$, and is used to represent $i$-th bilirubin detection performed for the newborn; $N$ represents $N$-th bilirubin detection latest performed for the newborn; $T_i$ represents a time of the $i$-th bilirubin detection, and $C_i$ represents a bilirubin concentration of the $i$-th bilirubin detection ⸺ S610

Calculating a characteristic value of phototherapy effect $C_{N, P}$ according to the detection data ($T_P$, $C_P$) of detection before start of the previous phototherapy and the detection data ($T_N$, $C_N$) of detection before start of a current phototherapy, where $C_{N, P} = C_N - C_P$, and an interval between $T_N$ and $T_P$ is 20-28 hours, and $P$ is a natural number and less than N ⸺ S620

Determining a phototherapy parameter adjustment strategy according to the characteristic value of phototherapy effect $C_{L-1, L}$ and the bilirubin concentration $C_L$ ⸺ S630

Determining the recommended phototherapy parameter of the current phototherapy according to the phototherapy parameter adjustment strategy and the phototherapy parameter of the previous phototherapy ⸺ S640

FIG. 11

Determining a previous phototherapy effect level according to the characteristic value of phototherapy effect $C_{L-1, L}$ ⸺ S710

Determining a current jaundice level according to the bilirubin concentration $C_L$ ⸺ S720

Determining the phototherapy parameter adjustment strategy according to the previous phototherapy effect level, the current jaundice level and a phototherapy parameter adjustment strategy mapping table; the phototherapy parameter adjustment strategy mapping table has a phototherapy parameter adjustment strategy corresponding to both any phototherapy effect level and any jaundice level ⸺ S730

FIG. 12

JAUNDICE DIAGNOSIS AND TREATMENT SYSTEM AND COMPUTER-READABLE STORAGE MEDIUM

CROSS-REFERENCE

The present application is the 371 application of PCT Application No. PCT/CN2021/093656, filed on May 13, 2021, which is based upon and claims the priority to the Chinese Patent Application NO. 202010498707.5, entitled "JAUNDICE DIAGNOSIS AND TREATMENT SYSTEM AND COMPUTER-READABLE STORAGE MEDIUM", filed on Jun. 4, 2020, the entire contents of which are hereby incorporated by reference.

TECHNICAL FIELD

The present disclosure relates to the field of medical device technologies, and in particular, to a system for diagnosing and treating jaundice and a computer-readable storage medium.

BACKGROUND

Neonatal jaundice is a phenomenon in which a bilirubin concentration in blood increases due to abnormal bilirubin metabolism in the body, resulting in yellowing of the skin, mucous membranes and sclera. About 80% of full-term infants and the vast majority of premature infants have transiently elevated bilirubin concentrations, most of which are physiological jaundice and a small portion of which are pathological jaundice. Severe pathological jaundice will cause hyperbilirubin encephalopathy (kernicterus), damage brain nerves of newborns (such as hyperactivity of hands and feet, loss of hearing, sluggish eyes, etc.), and even endanger lives of the newborns. Therefore, the real-time detection of bilirubin concentration in the bodies of the newborns is of great significance in the prevention and treatment of kernicterus.

It should be noted that the information disclosed in the Background section above is only for enhancing the understanding of the background of the present disclosure, and thus may include information that does not constitute prior art known to those of ordinary skill in the art.

SUMMARY

The present disclosure provides a system for diagnosing and treating jaundice and a computer-readable storage medium.

According to a first aspect of the present disclosure, there is provided a system for diagnosing and treating jaundice, including:

a control circuit;

a bilirubin detection component, communicatively coupled with the control circuit, and configured to detect a bilirubin concentration of a newborn and transmit the detected bilirubin concentration to the control circuit, so that detection data is generated by the control circuit according to the detected bilirubin concentration;

a risk evaluation circuit, communicatively coupled with the control circuit, and configured to acquire the detection data from the control circuit, and evaluate a risk level of pathological jaundice according to the detection data; and a display component, coupled with the control circuit, and configured to display the detection data and/or the risk level of pathological jaundice under control of the control circuit.

According to a second aspect of the present disclosure, there is provided a computer-readable storage medium, storing a computer program, and the computer program, when executed by a processor, implements the following data processing method:

detecting a bilirubin concentration of a newborn;

generating detection data according to the detected bilirubin concentration;

evaluating a risk level of pathological jaundice according to the detection data; and displaying the detection data and/or the risk level of pathological jaundice.

According to a third aspect of the present disclosure, there is provided a system for diagnosing and treating jaundice, including:

a processor; and a memory, configured to store an executable program of the processor;

wherein the processor is configured to execute the executable program to implement the following operations:

detecting a bilirubin concentration of a newborn;

generating detection data according to the detected bilirubin concentration;

evaluating a risk level of pathological jaundice according to the detection data; and displaying the detection data and/or the risk level of pathological jaundice.

According to a fourth aspect of the present disclosure, there is provided a method for diagnosing and treating jaundice, including:

detecting a bilirubin concentration of a newborn;

generating detection data according to the detected bilirubin concentration;

evaluating a risk level of pathological jaundice according to the detection data; and displaying the detection data and/or the risk level of pathological jaundice.

BRIEF DESCRIPTION OF THE DRAWINGS

The above and other features and advantages of the present disclosure will become more apparent from the detailed description of embodiments thereof with reference to the accompanying drawings.

FIG. 7 is a schematic flowchart of evaluating a risk level of pathological jaundice according to an embodiment of the present disclosure.

FIG. 8 is a schematic flowchart of evaluating a risk level of pathological jaundice according to an embodiment of the present disclosure.

FIG. 11 is a schematic flowchart of calculating a recommended phototherapy parameter according to an embodiment of the present disclosure.

FIG. 12 is a schematic flowchart of calculating a recommended phototherapy parameter according to an embodiment of the present disclosure.

REFERENCE SIGNS OF MAIN COMPONENTS IN FIGURES ARE DESCRIBED AS FOLLOWS 100, control circuit; 101, storage sub-circuit; 102, wireless communication sub-circuit; 200, bilirubin detection component; 300, risk evaluation circuit; 310, first data acquisition sub-circuit; 320, first determination sub-circuit; 330, second determination sub-circuit; 340, third determination sub-circuit; 350, fourth determination sub-circuit; 360, fifth determination sub-circuit; 370, risk evaluation sub-circuit; 400, display component; 500, phototherapy parameter calculation circuit; 510, second data acquisition sub-circuit; 520, phototherapy effect evaluation sub-circuit; 530, phototherapy parameter evaluation sub-circuit; 540, phototherapy parameter confirmation sub-circuit; 600, phototherapy component; 700, input component; 010, electronic device; 020, computer readable storage medium.

DETAILED DESCRIPTION

Embodiments will now be described more fully with reference to the accompanying drawings. However, the embodiments can be implemented in a variety of forms and should not be construed as being limited to examples set forth herein; rather, these embodiments are provided so that the present disclosure will be more full and complete so as to convey the idea of the embodiments to those skilled in this art.

The described features, structures, or characteristics in one or more embodiments may be combined in any suitable manner. In the following description, many specific details are provided to give a full understanding of the embodiments of the present disclosure. However, those skilled in the art will appreciate that the technical solution of the present disclosure may be practiced without one or more of the specific details, or other methods, components, materials, and the like may be employed. In other instances, well-known structures, materials or operations are not shown or described in detail to avoid obscuring the main technical idea of the present disclosure.

When a structure is "on" another structure, it may mean that the structure is integrally formed on another structure, or that the structure is "directly" disposed on another structure, or that the structure is "indirectly" disposed on another structure through other structures.

The terms "one", "a" and "the" are used to indicate that there are one or more elements/components or the like; the terms "include" and "have" are used to indicate an open type meaning of including and means that there may be additional elements/components/etc. in addition to the listed elements/components/etc. The terms "first" and "second" etc. are used only as markers, and do not limit the number of objects.

Figure 1:
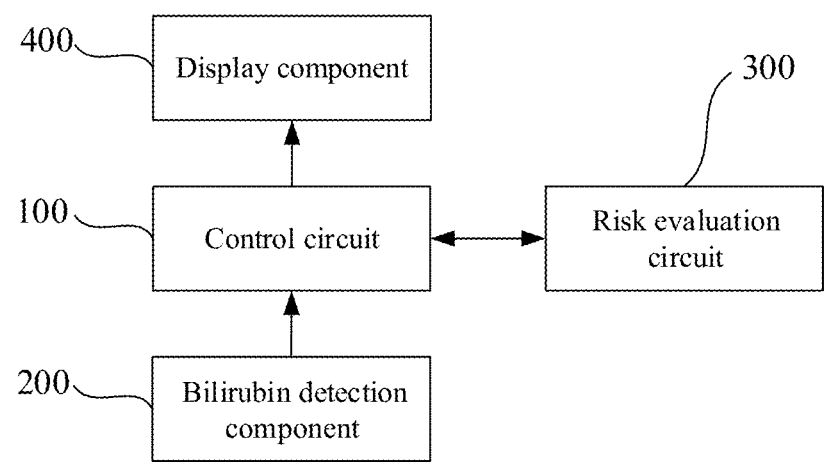
FIG. 1 is a schematic structural diagram of a system for diagnosing and treating jaundice according to an embodiment of the present disclosure.

The present disclosure provides a system for diagnosing and treating jaundice. As shown in FIG. 1, the system for diagnosing and treating jaundice includes a control circuit 100, a bilirubin detection component 200, a risk evaluation circuit 300 and a display component 400.

The bilirubin detection component 200 is communicatively coupled with the control circuit 100, and is configured to detect a bilirubin concentration of a newborn and transmit the detected bilirubin concentration to the control circuit 100, so that detection data is generated by the control circuit 100 according to the detected bilirubin concentration. The risk evaluation circuit 300 is communicatively coupled with the control circuit 100, and is configured to acquire the detection data from the control circuit 100, and evaluate a risk level of pathological jaundice according to the detection data. The display component 400 is coupled with the control circuit 100, and is configured to display the detection data and/or the risk level of pathological jaundice under control of the control circuit 100.

The system for diagnosing and treating jaundice provided by the present disclosure is provided with the risk evaluation circuit 300, and the risk evaluation circuit 300 can evaluate the risk level of pathological jaundice according to the detection data. In this way, when the risk level of neonatal pathological jaundice is the medium risk or the low risk, medical staff can perform bilirubin detection on the newborn according to a normal detection frequency. When the risk level of neonatal pathological jaundice is the high risk, the medical staff can increase a bilirubin measurement frequency for the newborn, so as to timely diagnose the neonatal pathological jaundice and carry out treatment in time. Therefore, the system for diagnosing and treating jaundice provided by the present disclosure can screen out the newborn with a high risk level of pathological jaundice, thereby prompting the medical staff to increase a bilirubin detection frequency in a targeted manner, and achieving the timely discovery and timely treatment of the pathologic jaundice without generally increasing burden on medical staff.

In the following, the system for diagnosing and treating jaundice provided by the present disclosure will be further explained and described with reference to the accompanying drawings.

As shown in FIG. 1, the control circuit 100 is configured to be communicatively coupled with the bilirubin detection component 200, the risk evaluation circuit 300 and the display component 400. In this way, the control circuit 100 can receive the bilirubin concentration obtained by the bilirubin detection component 200 in a process of detecting the newborn, and can generate the detection data $(T_i, C_i)$ according to the acquired the bilirubin concentration $C_i$ and the acquired detection time $T_i$, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection. The control circuit 100 can also send the detection data to the risk evaluation circuit 300 and receive the risk level of pathological jaundice generated by the risk evaluation circuit 300. In addition, the control circuit 100 can also send one or both of the detection data and the risk level of pathological jaundice to the display component 400, so as to present one or both of the detection data and the risk level of pathological jaundice.

The control circuit 100 may be a custom chip, or one of PLC, MCU, and CPU, and may also be a part of a circuit in the PLC, a part of a circuit in the MCU, or a part of a circuit in the CPU, which is not particularly limited by the present disclosure.

Figure 2:
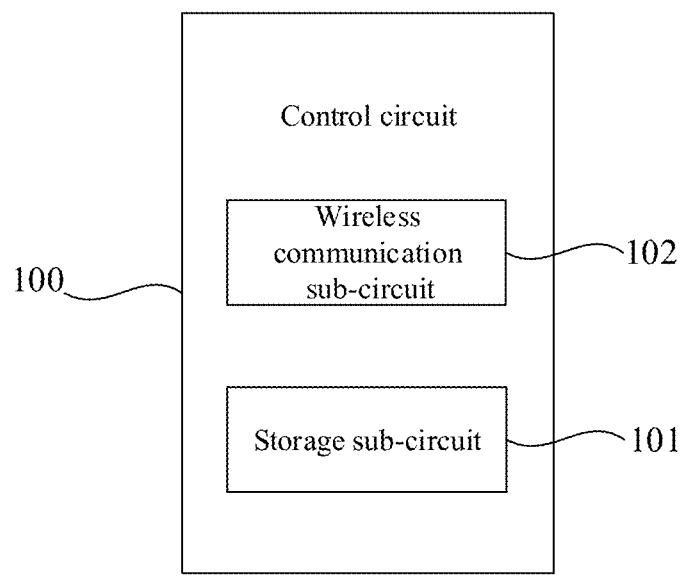
FIG. 2 is a schematic structural diagram of a control circuit according to an embodiment of the present disclosure.

In some embodiments of the present disclosure, as shown in FIG. 2, the control circuit 100 may include a storage sub-circuit 101, and the storage sub-circuit 101 is configured to store various detection data so as to be called by other circuits or components of the system for diagnosing and treating jaundice. In addition, the storage sub-circuit 101 may include a memory, which, for example, may include one or more of a flash, a Read Only Memory (ROM), a mechanical hard disk, and the like.

Figure 3:
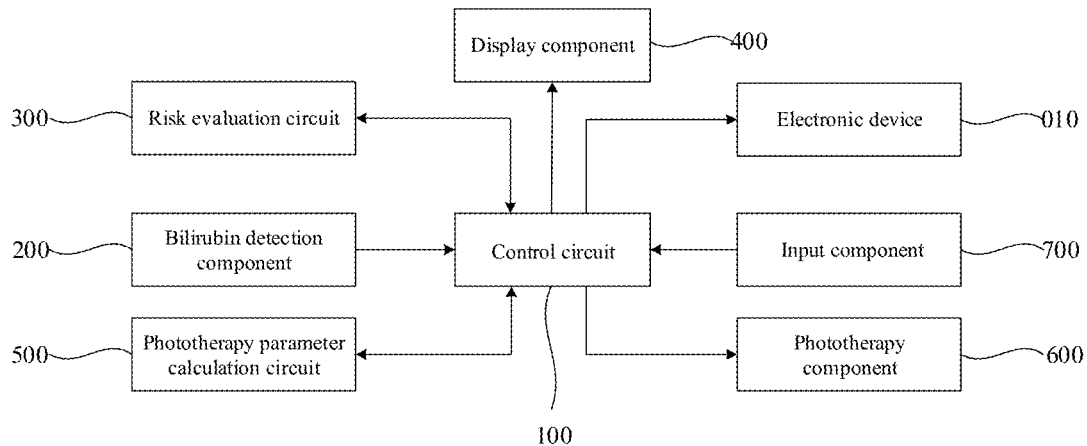
FIG. 3 is a schematic structural diagram of a system for diagnosing and treating jaundice according to an embodiment of the present disclosure.

In some embodiments of the present disclosure, as shown in FIG. 2, the control circuit 100 may further include a wireless communication sub-circuit 102, which may be a radio frequency circuit, a Bluetooth circuit, a WiFi circuit, a 4G communication circuit, a 5G communication circuit or other circuits. As shown in FIG. 3, by means of the wireless communication sub-circuit 102, the control circuit 100 can communicate with one or more electronic devices 010. The electronic device 010 may be a server or a terminal. In this way, the system for diagnosing and treating jaundice can send relevant data, such as the detection data, the risk level of pathological jaundice, etc., to the server or the terminal. The server or the terminal can run the software or APP to display this information to a user. It can be understood that the control circuit 100 can also upload other information. For example, the control circuit 100 can also send a birth date, gender, weight, health status and other information of the newborn to the server or the terminal. In an implementation, the electronic device 010 can run an electronic medical record system, and the electronic medical record system can receive the information uploaded by the control circuit 100 and display it to the user.

In an embodiment of the present disclosure, the control circuit 100 can also mark each piece of detection data to distinguish different newborns. In this way, the risk evaluation circuit 300 only uses the detection data of the same newborn when evaluating the risk level of pathological jaundice. Accordingly, the system for diagnosing and treating jaundice provided by the present disclosure can diagnose and treat different newborns at the same time.

In another embodiment of the present disclosure, the control circuit 100 may further include a flag bit in the detection data, and the flag bit is used to mark the newborn corresponding to the detection data. For example, the detection data can be expressed as ($B_x$, $T_i$, $C_i$), where $B_x$ represents a number (or a serial number) of the newborn, $T_i$ is the detection time of the i-th bilirubin detection of the newborn whose number is $B_x$, and $C_i$ is the bilirubin concentration of the i-th bilirubin detection of the newborn whose number is $B_x$.

In some embodiments of the present disclosure, as shown in FIG. 3, the system for diagnosing and treating jaundice of the present disclosure may further include an input component 700, and the input component 700 may be used by the medical staff to input information such as numbers (or serial numbers) of different newborns, whether the newborn is full-term, the birth date of the newborn, the gender of the newborn. In other words, by means of the input component 700, the system for diagnosing and treating jaundice can establish the electronic medical record of the newborn. The number can be a digital number, an alphabet number, a name, etc., which is not limited by the present disclosure, as long as different newborns can be distinguished. The input component 700 may include a keyboard, a key, a touch screen, a voice recognition circuit, a two-dimensional code scanning circuit, a barcode scanning circuit, or other components that can be used for information input, which is not specifically limited by the present disclosure.

The bilirubin detection component 200 is configured to detect the bilirubin concentration of the newborn. In some embodiments of the present disclosure, the bilirubin detection component 200 includes a transcutaneous bilirubin detector, which is configured to detect the bilirubin in the skin of the newborn in a non-invasive manner and then determine a serum bilirubin concentration of the newborn, the serum bilirubin concentration is the bilirubin concentration obtained by the bilirubin detection component 200. After the transcutaneous bilirubin detector touches the forehead skin or the skin of another part of the newborn, it can send detection light to the skin and receive the reflected light, and then calculate the serum bilirubin concentration. In this way, the bilirubin detection component 200 has advantages of fast detection speed and convenient detection, which facilitates the medical staff to timely and conveniently detect the bilirubin concentration of the newborn in a relatively high frequency.

In some embodiments of the present disclosure, the bilirubin detection component 200 may be communicatively coupled with the control circuit 100 in a wired or wireless manner.

The display component 400 may include an LCD display panel, an OLED display panel, a Micro LED display panel, or other types of display panels, which are not specifically limited by the present disclosure.

Figure 4:
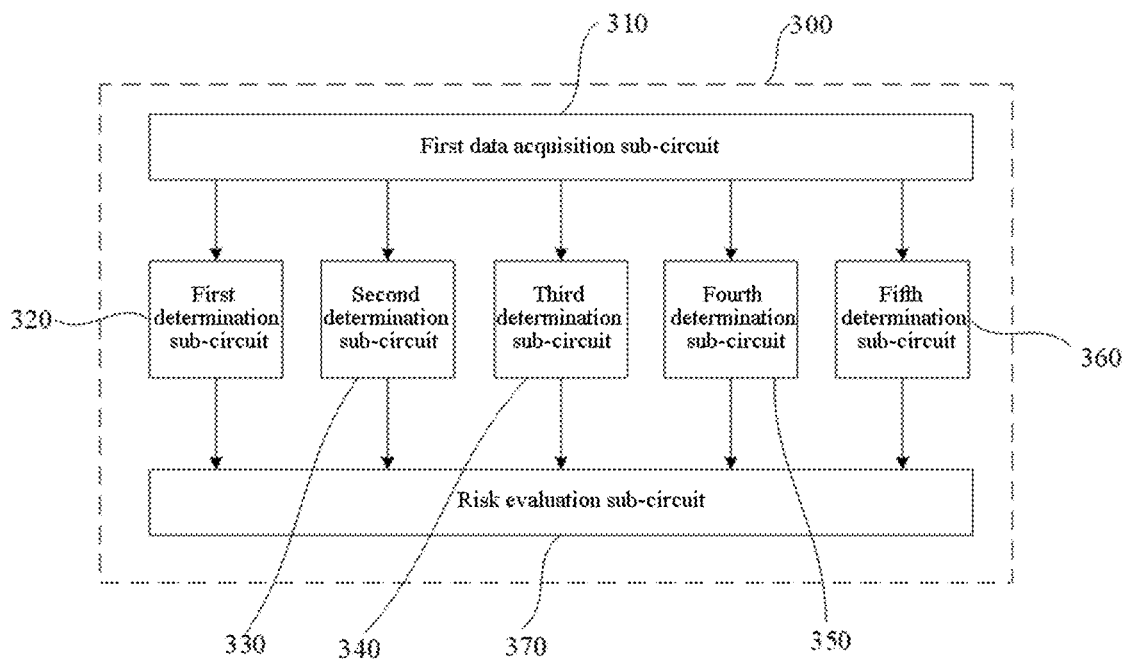
FIG. 4 is a schematic structural diagram of a risk evaluation circuit according to an embodiment of the present disclosure.

In some embodiments of the present disclosure, as shown in FIG. 4, the risk evaluation circuit 300 may include a first data acquisition sub-circuit 310, a first determination sub-circuit 320, a second determination sub-circuit 330, a third determination sub-circuit 340, and a risk evaluation sub-circuit 370.

The first data acquisition sub-circuit 310 is communicatively coupled with the control circuit 100, and is configured to acquire a birth time $T_B$ of the newborn, information on whether the newborn is full-term, and the detection data ($T_i$, $C_i$) of the newborn, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection.

The first determination sub-circuit 320 is coupled with the first data acquisition sub-circuit 310, and is configured to, according to the detection data ($T_N$, $C_N$), determine whether an interval time $T_{N,B}$ between a detection time $T_N$ and the birth time $T_B$ is less than a first time threshold $T_{ref1}$, and determine whether the bilirubin concentration $C_N$ is greater than a first concentration threshold $C_{ref1}$, and is configured to generate first confirmation information when it is determined that the interval time $T_{N,B}$ is less than the first time threshold $T_{ref1}$ and the bilirubin concentration $C_N$ is greater than the first concentration threshold $C_{ref1}$.

The second determination sub-circuit 330 is coupled with the first data acquisition sub-circuit 310, and is configured to, according to the detection data ($T_N$, $C_N$), determine whether the bilirubin concentration $C_N$ is greater than a second concentration threshold $C_{ref2}$ which is greater than the first concentration threshold $C_{ref1}$, where when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, and the first reference concentration $C_{ref21}$ is less than the second reference concentration $C_{ref22}$; and is configured to generate second confirmation information when it is determined that the bilirubin concentration $C_N$ is greater than the second concentration threshold $C_{ref2}$.

The third determination sub-circuit 340 is coupled with the first data acquisition sub-circuit 310, and is configured to calculate a first concentration change rate $V_{N,N-1}$ according to the detection data $(T_N, C_N)$ and the detection data $(T_{N-1}, C_{N-1})$ when N is greater than 1, where $V_{N,N-1}=(C_N-C_{N-1})/(T_N-T_{N-1})$; and is configured to generate third confirmation information when the first concentration change rate $V_{N,N-1}$ is greater than a reference rate threshold $V_{ref1}$.

The risk evaluation sub-circuit 370 is communicatively coupled with the first determination sub-circuit 320, the second determination sub-circuit 330 and the third determination sub-circuit 340, and is configured to determine that the risk level of pathological jaundice is a high risk when receiving the first confirmation information, the second confirmation information or the third confirmation information.

It can be understood that, in one evaluation process, various data acquired by the risk evaluation circuit 300, such as whether the newborn is full-term and the detection data $(T_i, C_i)$ of the newborn, is the data of the same newborn. When the system for diagnosing and treating jaundice provided by the present disclosure confirms that the risk level of pathological jaundice is the high risk, the medical staff can increase the monitoring frequency for the newborn according to the evaluation result, so as to timely confirm whether the newborn has the pathological jaundice, and promptly start treatment after the pathological jaundice is diagnosed. In addition, the medical staff can also timely collect a blood sample of the newborn to analyze other physiological indicators of the newborn, or detect the blood sample to analyze the bilirubin concentration in serum, so as to improve the accuracy of neonatal pathological jaundice diagnosis.

In some embodiments of the present disclosure, the first time threshold $T_{ref1}$ is in a range of 20-28 hours. For example, the first time threshold $T_{ref1}$ is 24 hours.

In some embodiments of the present disclosure, the first concentration threshold $C_{ref1}$ is in a range of 85 μmol/L-119 μmol/L. For example, the first concentration threshold $C_{ref1}$ is 103 μmol/L.

In some embodiments of the present disclosure, the first reference concentration $C_{ref21}$ is in a range of 203 μmol/L-237 μmol/L. For example, the first reference concentration $C_{ram}$ is 220 μmol/L.

In some embodiments of the present disclosure, the second reference concentration $C_{ref22}$ is in a range of 240 μmol/L-274 μmol/L. For example, the second reference concentration $C_{ref22}$ is 257 μmol/L.

In some embodiments of the present disclosure, the reference rate threshold $V_{ref1}$ is in a range of 68 μmol/(L·day)-102 μmol/(L·day). For example, the reference rate threshold $V_{ref1}$ is 85.5 μmol/(L·day).

In some embodiments of the present disclosure, the first determination sub-circuit 320 is further configured to generate first negative information when the interval time $T_{N,B}$ is not less than the first time threshold $T_{ref1}$ or the bilirubin concentration $C_N$ is not greater than the first concentration threshold $C_{ref1}$.

The second determination sub-circuit 330 is further configured to generate second negative information when the bilirubin concentration $C_N$ is not greater than the second concentration threshold $C_{ref2}$.

The third determination sub-circuit 340 is further configured to generate third negative information when the first concentration change rate $V_{N,N-1}$ is not greater than the reference rate threshold $V_{ref1}$.

As shown in FIG. 4, the risk evaluation circuit 300 may further include a fourth determination sub-circuit 350 and a fifth determination sub-circuit 360.

The fourth determination sub-circuit 350 is coupled with the first data acquisition sub-circuit 310, and is configured to calculate a first predicted concentration $C_{M1}$ after a first predicted time length $T_{M1}$ when N is greater than 1, where $C_{M1}=C_N+T_{M1}*(C_N-C_{N-1})/(T_N-T_{N-1})$; and is configured to generate fourth confirmation information when the first predicted concentration $C_{M1}$ is greater than a third concentration threshold $C_{ref3}$ which is greater than the first concentration threshold $C_{ref1}$.

The fifth determination sub-circuit 360 is coupled with the first data acquisition sub-circuit 310, and is configured to, when N is greater than 2, calculate a second predicted concentration $C_{M2}$ after a second predicted time length $T_{M2}$ where $C_{M2}=C_N+T_{M2}*(C_N-C_{N-1})/(T_N-T_{N-1})$, and calculate a second concentration change rate $V_{N-1,N-2}$ and compare the first concentration change rate $V_{N,N-1}$ and the second concentration change rate $V_{N-1,N-2}$; and where $V_{N-1,N-2}=(C_{N-1}-C_{N-2})/(T_{N-1}-T_{N-2})$; and the fifth determination sub-circuit 360 is further configured to generate fifth confirmation information when the second predicted concentration $C_{M2}$ is greater than a fourth concentration threshold $C_{ref4}$, and the first concentration change rate $V_{N,N-1}$ is greater than the second concentration change rate $V_{N-1,N-2}$, the fourth concentration threshold $C_{ref4}$ is greater than the first concentration threshold $C_{ref1}$, and the second predicted time length $T_{M2}$ is greater than the first predicted time length $T_{M1}$.

The risk evaluation sub-circuit 370 is also coupled with the fourth determination sub-circuit 350 and the fifth determination sub-circuit 360, and is further configured to determine that the risk level of pathological jaundice is a medium risk when receiving the first negative information, the second negative information and the third negative information, and receiving the fourth confirmation information or the fifth confirmation information.

When the risk evaluation result of pathological jaundice is the medium risk, the medical staff can detect the bilirubin concentration of the newborn according to the normal detection frequency, and can collect the blood sample of the newborn to directly detect the serum bilirubin concentration, if necessary. In addition, the risk evaluation result of pathological jaundice as the medium risk indicates that there is a certain possibility for the newborn to have the pathological jaundice, especially in the second predicted time length. Therefore, the medical staff needs to pay attention to a change in the bilirubin concentration of the newborn in the second predicted time length in the future.

In some embodiments of the present disclosure, the first predicted time length $T_{M1}$ is in the range of 20-28 hours. For example, the first predicted time length $T_{M1}$ is 24 hours.

In some embodiments of the present disclosure, the second predicted time length $T_{M2}$ is in a range of 44-52 hours. For example, the second predicted time length $T_{M2}$ is 48 hours.

In some embodiments of the present disclosure, the third concentration threshold $C_{ref3}$ is in the range of 203 μmol/L-237 μmol/L. For example, the third concentration threshold $C_{ref3}$ is 220 μmol/L.

In some embodiments of the present disclosure, the fourth concentration threshold $C_{ref4}$ is in the range of 203 μmol/L-237 μmol/L. For example, the fourth concentration threshold $C_{ref4}$ is 220 μmol/L.

In some embodiments of the present disclosure, the fourth determination sub-circuit 350 is further configured to generate fourth negative information when the first predicted concentration $C_{M1}$ is not greater than the third concentration threshold $C_{ref3}$.

The fifth determination sub-circuit 360 is further configured to generate fifth negative information when the second predicted concentration $C_{M2}$ is not greater than the fourth concentration threshold $C_{ref4}$ or the first concentration change rate $V_{N,N-1}$ is not greater than the second concentration change rate $V_{N-1,N-2}$.

The risk evaluation sub-circuit 370 is further configured to determine the risk level of pathological jaundice is a low risk when receiving the first negative information, the second negative information, the third negative information, the fourth negative information and the fifth negative information.

In this way, the system for diagnosing and treating jaundice provided by the present disclosure can comprehensively consider factors such as the birth time $T_B$ of the newborn, whether the newborn is full-term, the latest measured bilirubin concentration $C_N$, a growth rate of the bilirubin concentration, a change in the growth rate of the bilirubin concentration, and the prediction on the bilirubin concentration, and comprehensively evaluate the possibility of the newborn having the pathological jaundice, so that the medical staff can adjust the bilirubin detection frequency of the newborn and a degree of concern on the bilirubin detection of the newborn, so as to timely diagnosis and treat the newborn having the pathological jaundice, thereby ensuring the health of the newborn.

In some embodiments of the present disclosure, the first determination sub-circuit 320, the second determination sub-circuit 330, the third determination sub-circuit 340, the fourth determination sub-circuit 350, and the fifth determination sub-circuit 360 may each operate independently, and the risk evaluation sub-circuit 370 generates the evaluation result based on determination results of respective determination sub-circuits. For example, the first confirmation information generated by the first determination sub-circuit 320 is a parameter $A_1=1$, and the first negative information generated by the first determination sub-circuit 320 is the parameter $A_1=0$. The second confirmation information generated by the second determination sub-circuit 330 is a parameter $A_2=1$, and the second negative information generated by the second determination sub-circuit 330 is the parameter $A_2=0$. The third confirmation information generated by the third determination sub-circuit 340 is a parameter $A_3=1$, and the third negative information generated by the third determination sub-circuit 340 is the parameter $A_3=0$. The fourth confirmation information generated by the fourth determination sub-circuit 350 is a parameter $A_4=1$, and the fourth negative information generated by the fourth determination sub-circuit 350 is the parameter $A_4=0$. The fifth confirmation information generated by the fifth determination sub-circuit 360 is a parameter $A_5=1$, and the fifth negative information generated by the fifth determination sub-circuit 360 is the parameter $A_5=0$. The risk evaluation sub-circuit 370 acquires values of $A_1$, $A_2$, $A_3$, $A_4$, and $A_5$, and determines that the risk level of pathological jaundice is the high risk when any one of $A_1$, $A_2$ and $A_3$ is 1, determines that the risk level of pathological jaundice is the medium risk when $A_1$, $A_2$, and $A_3$ are all 0 and any one of $A_4$ and $A_5$ is 1, and determines that the risk level of pathological jaundice is the low risk, when $A_1$, $A_2$, $A_3$, $A_4$, and $A_5$ are all 0.

In another embodiment of the present disclosure, the first determination sub-circuit 320, the second determination sub-circuit 330, the third determination sub-circuit 340, the fourth determination sub-circuit 350 and the fifth determination sub-circuit 360 operate in sequence according to a preset order. A result of a determination sub-circuit that operates first is sent to the risk evaluation sub-circuit 370. If the risk evaluation sub-circuit 370 can determine the risk level of pathological jaundice according to the existing result, the subsequent determination sub-circuits will no longer operate. If the risk evaluation sub-circuit 370 cannot determine the risk level of pathological jaundice according to the existing result, the subsequent determination sub-circuits will continue to operate. For example, individual determination sub-circuits can operate in sequence in an order of the first determination sub-circuit 320, the second determination sub-circuit 330, the third determination sub-circuit 340, the fourth determination sub-circuit 350 and the fifth determination sub-circuit 360. If the first determination sub-circuit 320 generates the first confirmation information, the risk evaluation sub-circuit 370 determines that the risk level of pathological jaundice is the high risk, and then the second determination sub-circuit 330, the third determination sub-circuit 340, the fourth determination sub-circuit 350 and the fifth determination sub-circuit 360 will no longer operate. If the first determination sub-circuit 320 generates the first negative information, the risk evaluation sub-circuit 370 cannot determine the risk level of pathological jaundice, and the second determination sub-circuit 330 continues to operate.

In some embodiments of the present disclosure, when the risk evaluation sub-circuit 370 cannot determine the risk level of pathological jaundice, the risk level of pathological jaundice may be determined to be an unknown risk. For example, when the number of neonatal bilirubin detection times is only one, the third determination sub-circuit 340 cannot operate. As a result, the third confirmation information or the third negative information cannot be generated, and the risk evaluation sub-circuit 370 can only determine whether the risk level of pathological jaundice is the high risk according to the received first confirmation information or second confirmation information. When the risk level of pathological jaundice cannot be determined to be the high risk, the risk level of pathological jaundice is determined to be the unknown risk. In this way, the risk evaluation sub-circuit 370 can only make the risk evaluation for deterministic situations, so as to ensure the accuracy of the risk level evaluation result of pathological jaundice, and avoid generating the low risk level evaluation result in the case of lack of data to mislead the medical staff. In addition, when the number of neonatal bilirubin detection times is only one, the fourth determination sub-circuit 350 and the fifth determination sub-circuit 360 cannot generate corresponding confirmation information or negative information. The risk evaluation circuit 300 can only determine that the risk level of pathological jaundice is the unknown risk or the high risk.

When the number of neonatal bilirubin detection times is only two, the fifth determination sub-circuit 360 cannot generate the corresponding confirmation information or negative information. The risk evaluation circuit 300 can only determine the risk level of pathological jaundice as the unknown risk, the high risk or the medium risk.

In some embodiments of the present disclosure, after determining the risk level of pathological jaundice, the risk evaluation circuit 300 may send the determined risk level of pathological jaundice to the control circuit 100.

In some embodiments of the present disclosure, the risk evaluation circuit 300 may be a custom chip, or one of PLC, MCU, and CPU, and may also be a part of a circuit in the PLC, a part of a circuit in the MCU, or a part of a circuit in the CPU, which is not particularly limited by the present disclosure.

In some embodiments of the present disclosure, the control circuit 100 can also be configured to receive a phototherapy parameter that has been applied to the newborn. As shown in FIG. 3, the system for diagnosing and treating jaundice may further include:

a phototherapy parameter calculation circuit 500, communicatively coupled with the control circuit 100, and configured to acquire the detection data and the applied phototherapy parameter from the control circuit 100, and calculate a recommended phototherapy parameter according to the detection data and the applied phototherapy parameter; and the display component 400 is further configured to display the recommended phototherapy parameter under the control of the control circuit 100.

In this way, the system for diagnosing and treating jaundice provided by the present disclosure can also obtain the recommended phototherapy parameter according to the phototherapy parameter that has been applied to the newborn and the detection data. The medical staff can perform phototherapy on the newborn according to the recommended phototherapy parameter. Thus, the newborns can be given the personalized phototherapy, so as to avoid prolonged disease course due to insufficient phototherapy and a negative effect on the newborn due to excessive phototherapy.

Figure 5:
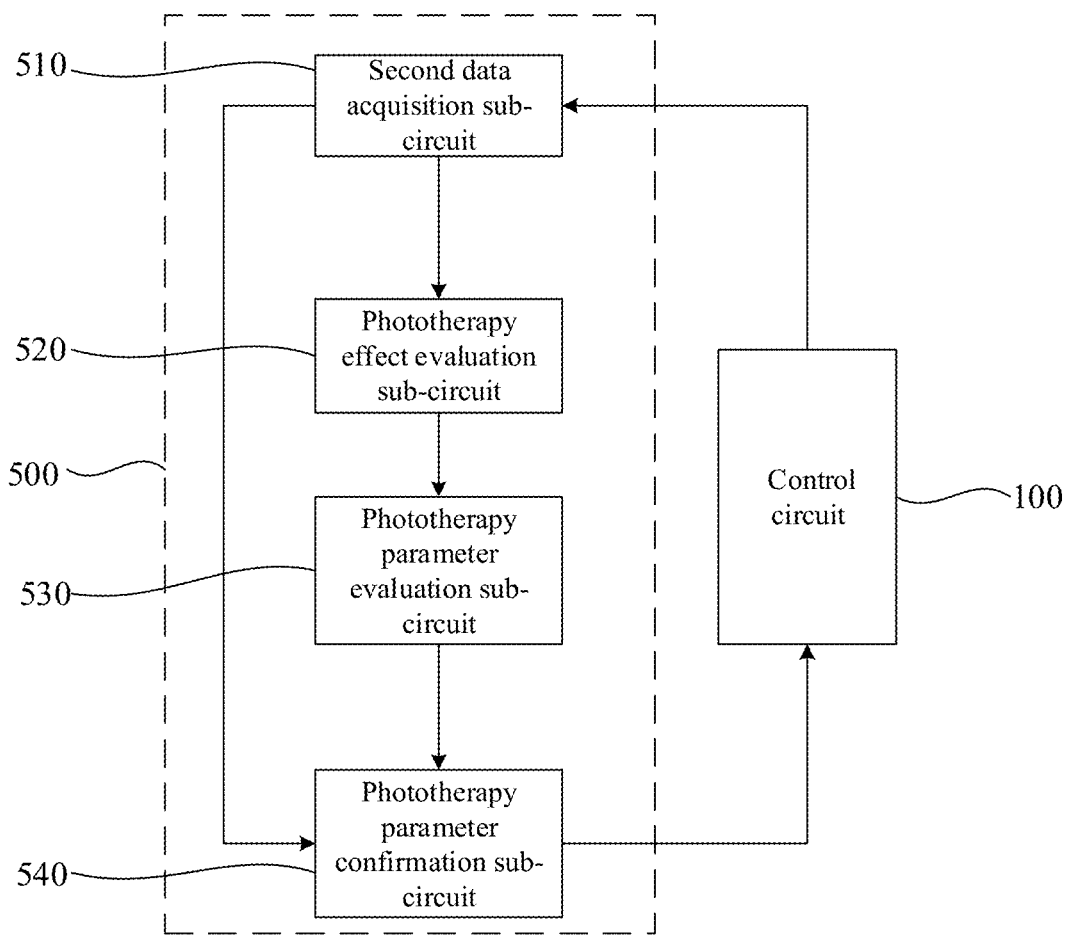
FIG. 5 is a schematic structural diagram of a phototherapy parameter calculation circuit according to an embodiment of the present disclosure.

In some embodiments of the present disclosure, as shown in FIG. 5, the phototherapy parameter calculation circuit 500 includes a second data acquisition sub-circuit 510, a phototherapy effect evaluation sub-circuit 520, a phototherapy parameter evaluation sub-circuit 530, and a phototherapy parameter confirmation sub-circuit 540.

The second data acquisition sub-circuit 510 is communicatively coupled with the control circuit 100, and is configured to acquire the detection data $(T_i, C_i)$ of the newborn and the phototherapy parameter that has been applied to the newborn, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection; and the applied phototherapy parameter is a phototherapy parameter of a previous phototherapy.

The phototherapy effect evaluation sub-circuit 520 is electrically coupled with the second data acquisition sub-circuit 510, and is configured to calculate a characteristic value of phototherapy effect $C_{N,P}$ according to detection data $(T_P, C_P)$ of detection before start of the previous phototherapy and detection data $(T_N, C_N)$ of detection before start of a current phototherapy, where $C_{N,P}=C_N-C_P$; and an interval between $T_N$ and $T_P$ is 20-28 hours, and P is a natural number and less than N.

The phototherapy parameter evaluation sub-circuit 530 is coupled with the phototherapy effect evaluation sub-circuit 520, and is configured to determine a phototherapy parameter adjustment strategy according to the characteristic value of phototherapy effect $C_{L-1, L}$ and the bilirubin concentration $C_L$.

The phototherapy parameter confirmation sub-circuit 540 is coupled with the phototherapy parameter evaluation sub-circuit 530, the second data acquisition sub-circuit 510 and the control circuit 100, and is configured to determine a recommended phototherapy parameter of the current phototherapy according to the phototherapy parameter adjustment strategy and the phototherapy parameter of the previous phototherapy.

In this way, the system for diagnosing and treating jaundice of the present disclosure can detect the bilirubin concentration before the previous phototherapy and obtain the detection data $(T_P, C_P)$, and detect the bilirubin concentration before the current phototherapy and obtain the detection data $(T_N, C_N)$. Then, a difference between the two concentrations can be calculated as the characteristic value of phototherapy effect $C_{N,P}$, which can reflect the change in the bilirubin concentration of the newborn since the previous phototherapy, and then can be used to characterize the effect of the previous phototherapy. The detected bilirubin concentration $C_N$ before the current phototherapy can reflect the severity of the neonatal pathological jaundice. In this way, the present disclosure comprehensively considers the effect of the previous phototherapy and the severity of the neonatal pathological jaundice, and then determines the phototherapy parameter of the current phototherapy on the basis of the phototherapy parameter of the previous phototherapy, thereby ensuring that the newborn can obtain the personalized phototherapy with a better effect, and ensuring the health of the newborn.

In some embodiments of the present disclosure, the phototherapy parameter can be expressed in different forms according to different scenarios, which is basically used to reflect a light power W and a light time t irradiated to the neonatal body surface. In addition, a light color or a light wavelength selected for the phototherapy can also be included. A dose of phototherapy can be reflected according to the light power W and the light time t irradiated to the neonatal body surface. For example, the phototherapy parameter can be expressed as $(W_j, t_j)$, where j is a natural number and not greater than L, which is used to represent j-th phototherapy performed for the newborn, and L represents L-th phototherapy currently performed for the newborn. $W_j$ represents the light power irradiated to the neonatal body surface during the j-th phototherapy, and $t_j$ represents the light time of the j-th phototherapy. Therefore, the phototherapy parameter of the previous phototherapy that can be acquired by the second data acquisition sub-circuit 510 can be expressed as ($W_{L-1}$, $t_{L-1}$), and the recommended phototherapy parameter of the current phototherapy can be expressed as ($W_L$, $t_L$).

It can be understood that the above-mentioned form of the phototherapy parameter is only an example, and other equivalent forms can also be used for substitution or conversion. For example, the light power W irradiated to the neonatal body surface can be characterized or replaced by a distance between a light source and the newborn, or can be characterized or replaced by a power of the light source, or can be characterized or replaced by a ratio of light sources turned on among a plurality of light sources.

In some embodiments of the present disclosure, the system for diagnosing and treating jaundice may store a plurality of phototherapy parameters in advance. In this way, the phototherapy parameter confirmation sub-circuit 540 can select from the plurality of preset phototherapy parameters according to the phototherapy parameter of the previous phototherapy and the phototherapy parameter adjustment strategy. In an implementation of the present disclosure, different phototherapy parameters are set as different phototherapy dose levels, so that the phototherapy parameter adjustment strategy may be to increase the phototherapy dose level or decrease the phototherapy dose level, or increase the phototherapy dose level by one or more levels, or decrease the phototherapy dose level by one or more levels.

For example, 100 phototherapy parameters may be pre-stored in the memory of the control circuit 100, which are sequenced as phototherapy dose level 1 to phototherapy dose level 100 according to an ascending order of magnitudes of phototherapy doses.

In some embodiments of the present disclosure, the phototherapy parameter evaluation sub-circuit 530 may be configured to:

determine a previous phototherapy effect level according to the characteristic value of phototherapy effect $C_{L-1, L}$;

determine a current jaundice level according to the bilirubin concentration $C_L$; and determine the phototherapy parameter adjustment strategy according to the previous phototherapy effect level, the current jaundice level and a phototherapy parameter adjustment strategy mapping table; and the phototherapy parameter adjustment strategy mapping table has a phototherapy parameter adjustment strategy corresponding to both any phototherapy effect level and any jaundice level.

In some embodiments of the present disclosure, a phototherapy effect level table may be established in advance, and the phototherapy effect level table records a characteristic value range of phototherapy effect corresponding to any phototherapy effect level. The phototherapy parameter evaluation sub-circuit 530 may determine the previous phototherapy effect level according to the characteristic value of phototherapy effect $C_{L-1, L}$ by looking up the phototherapy effect level table. For example, the phototherapy effect levels can be divided into 3-7 levels.

In an implementation of the present disclosure, the phototherapy effect level table is shown in Table 1:

TABLE 1

| Phototherapy effect level table | |
|---|---|
| Phototherapy effect level | A characteristic value range of phototherapy effect |
| Excellent level | ≥85 μmol/L |
| Good level | [17 μmol/L, 85 μmol/L) |
| Medium level | [−17 μmol/L, 17 μmol/L) |
| Inferior level | [−85 μmol/L, −17 μmol/L) |
| Poor level | <−85 μmol/L |

According to the phototherapy effect level table shown in Table 1, when the characteristic value of phototherapy effect $C_{L-1, L}$ is not less than 85 μmol/L, the phototherapy effect level is the excellent level; when the characteristic value of phototherapy effect $C_{L-1,L}$ is in a range of [17 μmol/L, 85 μmol/L), the phototherapy effect level is the good level; when the characteristic value of phototherapy effect $C_{L-1, L}$ is in a range of [−17 μmol/L, 17 μmol/L), the phototherapy effect level is the medium level; when the characteristic value of phototherapy effect $C_{L-1, L}$ is in a range of [−85 μmol/L, −17 μmol/L), the phototherapy effect level is the inferior level; and when the characteristic value of phototherapy effect $C_{L-1, L}$ is less than −85 μmol/L, the phototherapy effect level is the poor level.

In some embodiments of the present disclosure, a jaundice level table can be established in advance, and the jaundice level table records jaundice levels and the corresponding bilirubin concentration ranges. Then, the phototherapy parameter evaluation sub-circuit 530 can determine the current jaundice level according to the bilirubin concentration $C_L$ by looking up the jaundice level table. In addition, the jaundice levels can be divided into 2-6 levels.

In an implementation of the present disclosure, the jaundice level table is shown in Table 2:

TABLE 2

| Jaundice level table | |
|---|---|
| Jaundice level | Bilirubin concentration range |
| Mild level | [170 μmol/L, 255 μmol/L) |
| Moderate level | [255 μmol/L, 340 μmol/L) |
| Severe level | [340 μmol/L, 425 μmol/L) |
| Extremely severe level | ≥425 μmol/L |

According to Table 2, when the bilirubin concentration $C_L$ is in a range of [170 μmol/L, 255 μmol/L), the current jaundice level is the mild level. When the bilirubin concentration $C_L$ is in a range of [255 μmol/L, 340 μmol/L), the current jaundice level is the moderate level. When the bilirubin concentration $C_L$ is in a range of [340 μmol/L, 425 μmol/L), the current jaundice level is the severe level. When the bilirubin concentration $C_L$ is not less than 425 μmol/L, the current jaundice level is the extremely severe level.

In some embodiments of the present disclosure, the phototherapy parameter adjustment strategy mapping table may be established in advance, and the phototherapy parameter adjustment strategy mapping table has a phototherapy parameter adjustment strategy corresponding to both any phototherapy effect level and any jaundice level. In an implementation of the present disclosure, the phototherapy parameter adjustment strategy mapping table is shown in Table 3:

TABLE 3

Phototherapy parameter adjustment strategy mapping table

| | Mild level | Moderate level | Severe level | Extremely severe level |
|---|---|---|---|---|
| Excellent level | Decrease the dose level by 3 levels | Decrease the dose level by 2 levels | Decrease the dose level by 1 level | Maintain the dose level |
| Good level | Decrease the dose level by 2 levels | Decrease the dose level by 1 level | Maintain the dose level | Increase the dose level by 1 level |
| Medium level | Decrease the dose level by 1 level | Maintain the dose level | Increase the dose level by 1 level | Increase the dose level by 2 levels |
| Inferior level | Maintain the dose level | Increase the dose level by 1 level | Increase the dose level by 2 levels | Increase the dose level by 3 levels |
| Poor level | Increase the dose level by 1 level | Increase the dose level by 2 levels | Increase the dose level by 3 levels | Increase the dose level by 4 levels |

In this way, the phototherapy parameter evaluation sub-circuit 530 can determine the phototherapy parameter adjustment strategy according to the previous phototherapy effect level, the current jaundice level, and the phototherapy parameter adjustment strategy mapping table.

In some embodiments of the present disclosure, the phototherapy parameter calculation circuit 500 may be a custom chip, or one of PLC, MCU, and CPU, and may also be a part of a circuit in the PLC, a part of a circuit in the MCU, or a part of a circuit in the CPU, which is not particularly limited by the present disclosure.

In some embodiments of the present disclosure, as shown in FIG. 3, the system for diagnosing and treating jaundice may further include a phototherapy component 600, and the phototherapy component 600 is electrically coupled with the control circuit 100, and is configured to perform illumination according to the recommended phototherapy parameter.

The phototherapy component 600 may include a plurality of LED lights, and the light emitted by the LED lights may be irradiated to the neonatal body surface to achieve the phototherapy for the newborn. In some embodiments of the present disclosure, the LED lights include blue LED lights, red LED lights and green LED lights. In this way, different LED lights can be selected to illuminate the newborn when needed, so as to maximize the phototherapy effect.

In an embodiment of the present disclosure, after determining the recommended phototherapy parameter, the system for diagnosing and treating jaundice may wait for confirmation or adjustment by the medical staff. The medical staff can confirm the recommended phototherapy parameter through the input component 700, or make confirmation after modifying the recommended phototherapy parameter. The control circuit 100 can control the phototherapy component 600 after receiving the confirmation signal, so that the phototherapy component 600 performs phototherapy for the newborn according to the confirmed phototherapy parameter.

In another embodiment of the present disclosure, after the system for diagnosing and treating jaundice determines the recommended phototherapy parameter, the control circuit 100 can directly control the phototherapy component 600, so that the phototherapy component 600 performs phototherapy for the newborn according to the recommended phototherapy parameter. In this way, the system for diagnosing and treating jaundice provided by the present disclosure can automatically start the phototherapy for the newborn according to the bilirubin concentration detected before the current phototherapy, the bilirubin concentration detected before the previous phototherapy, and the phototherapy parameter of the previous phototherapy, thereby achieving the automated and personalized phototherapy.

In some embodiments of the present disclosure, the system for diagnosing and treating jaundice may further include a power supply component configured to supply power to the system for diagnosing and treating jaundice. For example, the power supply component may be a battery, a charger, a voltage converter or other components that can supply power, which is not limited by the present disclosure.

Figure 6:
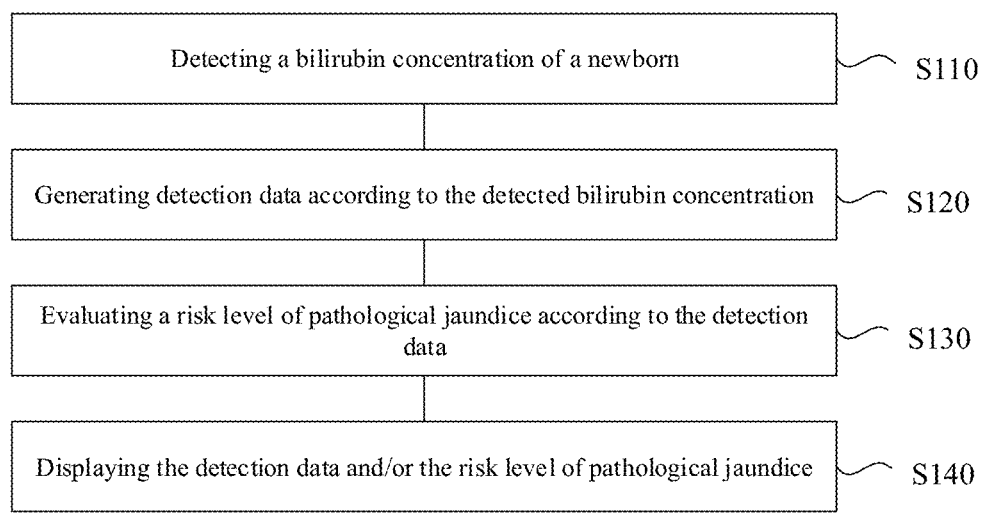
FIG. 6 is a schematic flowchart of a data processing method according to an embodiment of the present disclosure.
Figure 13:
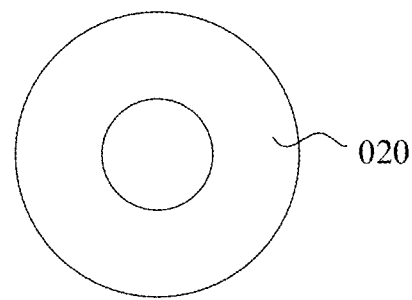
FIG. 13 is a schematic structural diagram of a computer-readable storage medium according to an embodiment of the present disclosure.

As shown in FIG. 13, the present disclosure also provides a computer-readable storage medium 020 on which a computer program is stored, and the computer program, when executed by a processor, can implement the data processing method described below. As shown in FIG. 6, the data processing method includes:

in step S110, a bilirubin concentration of a newborn is detected;

in step S120, detection data is generated according to the detected bilirubin concentration;

in step S130, a risk level of pathological jaundice is evaluated according to the detection data; and in step S140, the detection data and/or the risk level of pathological jaundice are displayed.

The data processing method provided by the present disclosure can evaluate the risk level of pathological jaundice according to the detection data. In this way, when the risk level of neonatal pathological jaundice is the medium risk or the low risk, medical staff can perform bilirubin detection on the newborn according to a normal detection frequency. When the risk level of neonatal pathological jaundice is the high risk, the medical staff can increase a bilirubin measurement frequency for the newborn, so as to timely diagnose the neonatal pathological jaundice and carry out treatment in time. Therefore, when the processor executes the data processing method according to the computer-readable storage medium provided by the present disclosure, it can screen out the newborn with a high risk level of pathological jaundice, thereby prompting the medical staff to increase a bilirubin detection frequency in a targeted manner, and achieving the timely discovery and timely treatment of the pathologic jaundice without generally increasing burden on medical staff.

In some embodiments of the present disclosure, as shown in FIG. 7, the evaluating the risk level of pathological jaundice according to the detection data includes:

in step S210, a birth time $T_B$ of the newborn, information on whether the newborn is full-term, and the detection data $(T_i, C_i)$ of the newborn are acquired, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection;

in step S220, according to the detection data $(T_N, C_N)$, it is determined whether an interval time $T_{N,B}$ between a detection time $T_N$ and the birth time $T_B$ is less than a first time threshold $T_{ref1}$, and whether the bilirubin concentration $C_N$ is greater than a first concentration threshold $C_{ref1}$, and first confirmation information is generated when it is determined that the interval time $T_{N,B}$ is less than the first time threshold $T_{ref1}$ and the bilirubin concentration $C_N$ is greater than the first concentration threshold $C_{ref1}$;

in step S230, it is determined whether the bilirubin concentration $C_N$ is greater than a second concentration threshold $C_{ref2}$ which is greater than the first concentration threshold $C_{ref1}$ according to the detection data $(T_N, C_N)$, where, when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, the first reference concentration $C_{ref21}$ is less than the second reference concentration $C_{ref22}$, and second confirmation information is generated when it is determined that the bilirubin concentration $C_N$ is greater than the second concentration threshold $C_{ref2}$;

in step S240, a first concentration change rate $V_{N,N-1}$ is calculated according to the detection data $(T_N, C_N)$ and the detection data $(T_{N-1}, C_{N-1})$ when N is greater than 1, where, $V_{N,N-1}=(C_N-C_{N-1})/(T_N-T_{N-1})$, and third confirmation information is generated when the first concentration change rate $V_{N,N-1}$ is greater than a reference rate threshold $V_{ref1}$; and in step S250, it is determined that the risk level of pathological jaundice is a high risk according to the first confirmation information, the second confirmation information or the third confirmation information.

In some embodiments of the present disclosure, as shown in FIG. 8, the evaluating the risk level of pathological jaundice according to the detection data further includes:

in step S310, first negative information is generated when the interval time $T_{N,B}$ is not less than the first time threshold $T_{ref1}$ or the bilirubin concentration $C_N$ is not greater than the first concentration threshold $C_{ref1}$;

in step S320, second negative information is generated when the bilirubin concentration $C_N$ is not greater than the second concentration threshold $C_{ref2}$;

in step S330, third negative information is generated when the first concentration change rate $V_{N,N-1}$ is not greater than the reference rate threshold $V_{ref1}$;

in step S340, a first predicted concentration $C_{M1}$ is calculated after a first predicted time length $T_{M1}$ when N is greater than 1, where $C_{M1}=C_N+T_{M1}*(C_N-C_{N-1})/(T_N-T_{N-1})$, and fourth confirmation information is generated when the first predicted concentration $C_{M1}$ is greater than a third concentration threshold $C_{ref3}$, and the third concentration threshold $C_{ref3}$ is greater than the first concentration threshold $C_{ref1}$;

in step S350, when N is greater than 2, a second predicted concentration $C_{M2}$ after a second predicted time length $T_{M2}$ is calculated where $C_{M2}=C_N+T_{M2}*(C_N-C_{N-1})/(T_N-T_{N-1})$, and a second concentration change rate $V_{N-1,N-2}$ is calculated and the first concentration change rate $V_{N,N-1}$ is compared with the second concentration change rate $V_{N-1,N-2}$, where $V_{N-1,N-2}=(C_{N-1}-C_{N-2})/(T_{N-1}-T_{N-2})$, and fifth confirmation information is generated when the second predicted concentration $C_{M2}$ is greater than a fourth concentration threshold $C_{ref4}$, and the first concentration change rate $V_{N,N-1}$ is greater than the second concentration change rate $V_{N-1,N-2}$, and the fourth concentration threshold $C_{ref4}$ is greater than the first concentration threshold $C_{ref1}$, and the second predicted time length $T_{M2}$ is greater than the first predicted time length $T_{M1}$; and in step S360, it is determined that the risk level of pathological jaundice is a medium risk according to the first negative information, the second negative information and the third negative information, and according to the fourth confirmation information or the fifth confirmation information.

Figure 9:
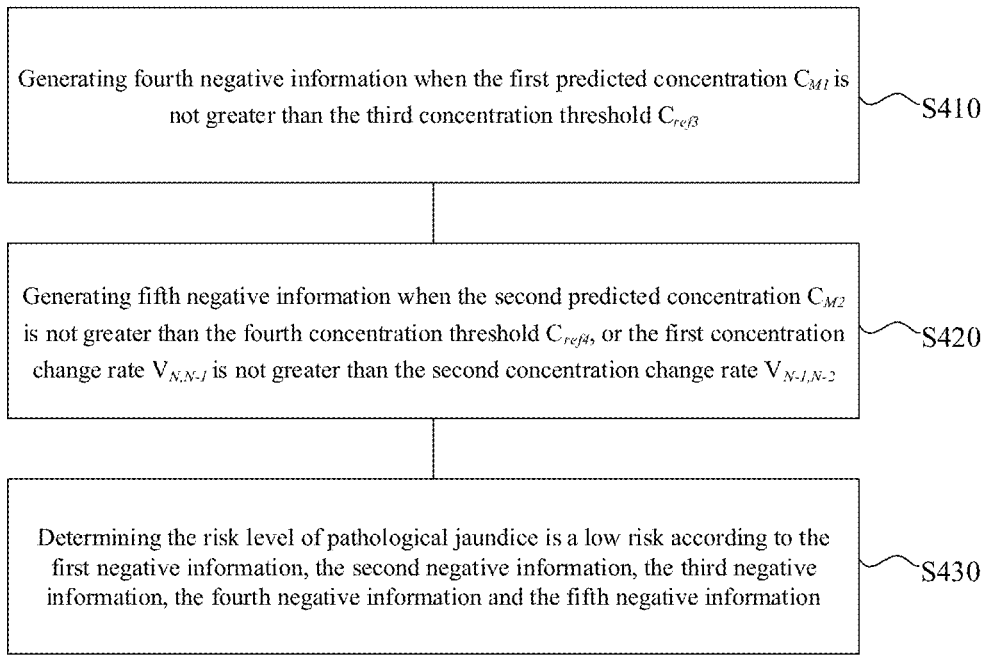
FIG. 9 is a schematic flowchart of evaluating a risk level of pathological jaundice according to an embodiment of the present disclosure.

In some embodiments of the present disclosure, as shown in FIG. 9, the evaluating the risk level of pathological jaundice according to the detection data further includes:

in step S410, fourth negative information is generated when the first predicted concentration $C_{M1}$ is not greater than the third concentration threshold $C_{ref3}$;

in step S420, fifth negative information is generated when the second predicted concentration $C_{M2}$ is not greater than the fourth concentration threshold $C_{ref4}$, or the first concentration change rate $V_{N,N-1}$ is not greater than the second concentration change rate $V_{N-1,N-2}$; and in step S430, it is determined the risk level of pathological jaundice is a low risk according to the first negative information, the second negative information, the third negative information, the fourth negative information and the fifth negative information.

Figure 10:
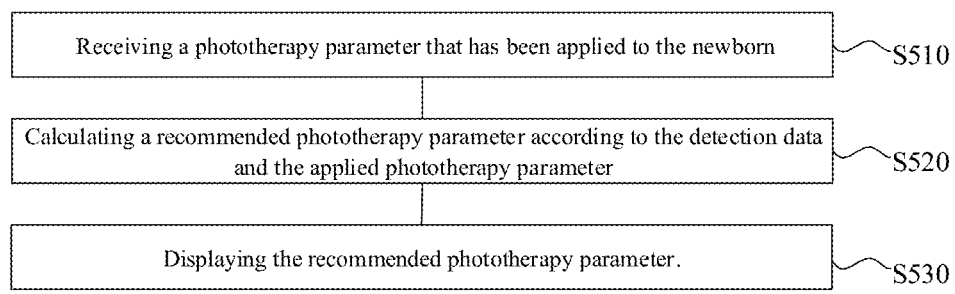
FIG. 10 is a schematic flowchart of some steps of a data processing method according to an embodiment of the present disclosure.

In some embodiments of the present disclosure, as shown in FIG. 10, the data processing method further includes:

in step S510, a phototherapy parameter that has been applied to the newborn is received;

in step S520, a recommended phototherapy parameter is calculated according to the detection data and the applied phototherapy parameter; and in step S530, the recommended phototherapy parameter is displayed.

In some embodiments of the present disclosure, as shown in FIG. 11, the calculating the recommended phototherapy parameter according to the detection data and the applied phototherapy parameter includes:

in step S610, the detection data $(T_i, C_i)$ of the newborn and the phototherapy parameter that has been applied to the newborn are acquired, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection;

in step S620, a characteristic value of phototherapy effect $C_{N,P}$ is calculated according to the detection data $(T_P, C_P)$ of detection before start of the previous phototherapy and the detection data $(T_N, C_N)$ of detection before start of a current phototherapy, where $C_{N,P}=C_N-C_P$, and an interval between $T_N$ and $T_P$ is 20-28 hours, and P is a natural number and less than N;

in step S630, a phototherapy parameter adjustment strategy is determined according to the characteristic value of phototherapy effect $C_{L-1,L}$ and the bilirubin concentration $C_L$; and in step S640, the recommended phototherapy parameter of the current phototherapy is determined according to the phototherapy parameter adjustment strategy and the phototherapy parameter of the previous phototherapy.

In some embodiments of the present disclosure, as shown in FIG. 12, the determining the phototherapy parameter adjustment strategy according to the characteristic value of phototherapy effect $C_{L-1,\ L}$ and the bilirubin concentration $C_L$ includes:

in step S710, a previous phototherapy effect level is determined according to the characteristic value of phototherapy effect $C_{L-1,\ L}$;

in step S720, a current jaundice level is determined according to the bilirubin concentration $C_L$; and in step S730, the phototherapy parameter adjustment strategy is determined according to the previous phototherapy effect level, the current jaundice level and a phototherapy parameter adjustment strategy mapping table, and the phototherapy parameter adjustment strategy mapping table has a phototherapy parameter adjustment strategy corresponding to both any phototherapy effect level and any jaundice level.

The details, principles, and effects of the data processing method provided by the present disclosure are described in the above-mentioned embodiments of the system for diagnosing and treating jaundice, or can be clearly derived from the technical solutions of the above-mentioned embodiments of the system for diagnosing and treating jaundice, which will not be repeated here.

It should be noted that although the various steps of the data processing method of the present disclosure are described in a particular order in the figures, this is not required or implied that these steps must be performed in the particular order, or all the steps shown must be performed to achieve the desired result. Additionally or alternatively, certain steps may be omitted, multiple steps may be combined into one step, and/or one step may be decomposed into multiple steps and so on, all of which should be considered as a part of the present disclosure.

The data processing method provided by the present disclosure can be implemented in a form of program product, for example, implemented as program codes or the like. The program product implementing the above data processing method can be stored in the computer-readable storage medium 020 of the present disclosure. When the program product runs on a terminal device, the program codes are used to cause the terminal device to execute individual steps of the data processing method described in the various embodiments of this specification.

The program product for implementing the above method according to an embodiment of the present disclosure can use a portable Compact Disc-Read-Only Memory (CD-ROM) and include the program codes, which may run on the terminal device, for example, a personal computer. However, the program product of the present disclosure is not limited thereto. In this document, the readable storage medium may be any tangible medium containing or storing the program, and the program may be used by or in combination with an instruction execution system, an apparatus, or a device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of the readable storage medium include: electrical connections with one or more wires, a portable disk, hard disk, a Random Access Memory (RAM), a Read-Only Memory (ROM), an Erasable Programmable Read-Only Memory (EPROM or flash memory), an optical fiber, a portable Compact Disc-Read-Only Memory (CD-ROM), an optical storage device, a magnetic storage device, or any suitable combination of the foregoing.

The computer-readable signal medium may include a data signal in a baseband or propagated as a part of a carrier wave, which carries readable program codes. Such propagated data signal may take many forms, including but not limited to an electromagnetic signal, an optical signal, or any suitable combination of the foregoing. The readable signal medium may also be any readable medium other than the readable storage medium, and the readable medium may send, propagate, or transmit the program for use by or in combination with the instruction execution system, the apparatus, or the device.

The program codes contained in the readable medium may be transmitted using any appropriate medium, including but not limited to wireless, wired, optical cable, RF, etc., or any suitable combination of the foregoing.

The program codes for performing operations of the present disclosure may be written in any combination of one or more programming languages, which include object-oriented programming languages, such as Java, C++, etc. and further include conventional procedural programming language, such as 'C' or a similar programming language. The program codes may be executed entirely or partly in a user computing device, may be executed as an independent software package, may be executed partly in the user computing device and partly in a remote computing device, or may be executed entirely in the remote computing device or server. In a case of involving the remote computing device, the remote computing device may be coupled with the user computing device via any kind of network, such as a Local Area Network (LAN) or a Wide Area Network (WAN), or it may be coupled with an external computing device, for example, coupled with the external computing device via Internet by use of an Internet service provider.

It should be understood that the present disclosure is not limited to the detailed structure and arrangement of components proposed by the present specification. The present disclosure is capable of having other embodiments, and be carried out and implemented in various manners. The foregoing variations and modifications fall within the scope of the present disclosure. It should be understood that the present disclosure disclosed and defined by the present specification extends to all alternative combinations of two or more of the individual features apparent or recited herein and/or in the drawings. All of these various combinations constitute a number of alternative aspects of the present disclosure. The embodiments described in the present specification are illustrative of the best mode for carrying out the present disclosure and will enable those skilled in the art to utilize the present disclosure.

What is claimed is:

1. A non-transitory computer-readable storage medium storing a computer program, which, when executed by a processor, causes a system to implement the following operations:

detecting a bilirubin concentration of a newborn;

generating detection data according to the detected bilirubin concentration;

evaluating a risk level of pathological jaundice according to the detection data; and displaying the detection data and/or the risk level of pathological jaundice, wherein the computer program, when executed by the processor, causes the system to further implement the following operations:

receiving a phototherapy parameter that has been applied to the newborn;

calculating a recommended phototherapy parameter according to the detection data and the applied phototherapy parameter;

displaying the recommended phototherapy parameter; and performing illumination according to the recommended phototherapy parameter, wherein evaluating the risk level of pathological jaundice according to the detection data comprises:

acquiring a birth time $T_B$ of the newborn, information on whether the newborn is full-term, and the detection data $(T_i, C_i)$ of the newborn, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection;

according to the detection data $(T_N, C_N)$, determining whether an interval time $T_{N,B}$ between a detection time $T_N$ and the birth time $T_B$ is less than a first time threshold $T_{ref1}$, and determining whether the bilirubin concentration $C_N$ is greater than a first concentration threshold $C_{ref1}$, and generating first confirmation information when it is determined that the interval time $T_{N,B}$ is less than the first time threshold $T_{ref1}$ and the bilirubin concentration $C_N$ is greater than the first concentration threshold $C_{ref1}$;

determining whether the bilirubin concentration $C_N$ is greater than a second concentration threshold $C_{ref2}$ which is greater than the first concentration threshold $C_{ref1}$ according to the detection data $(T_N, C_N)$, wherein, when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, the first reference concentration $C_{ref21}$ is less than the second reference concentration $C_{ref22}$, and generating second confirmation information when it is determined that the bilirubin concentration $C_N$ is greater than the second concentration threshold $C_{ref2}$;

calculating a first concentration change rate $V_{N,N-1}$ according to the detection data $(T_N, C_N)$ and the detection data $(T_{N-1}, C_{N-1})$ when N is greater than 1, where, $V_{N,N-1}=(C_N-C_{N-1})/(T_N-T_{N-1})$, and generating third confirmation information when the first concentration change rate $V_{N,N-1}$ is greater than a reference rate threshold $V_{ref1}$; and determining that the risk level of pathological jaundice is a high risk according to the first confirmation information, the second confirmation information or the third confirmation information.

2. The non-transitory computer-readable storage medium according to claim 1, wherein the evaluating the risk level of pathological jaundice according to the detection data further comprises:

generating first negative information when the interval time $T_{N,B}$ is not less than the first time threshold $T_{ref1}$ or the bilirubin concentration $C_N$ is not greater than the first concentration threshold $C_{ref1}$;

generating second negative information when the bilirubin concentration $C_N$ is not greater than the second concentration threshold $C_{ref2}$;

generating third negative information when the first concentration change rate $V_{N,N-1}$ is not greater than the reference rate threshold $V_{ref1}$;

calculating a first predicted concentration $C_{M1}$ after a first predicted time length $T_{M1}$ when N is greater than 1, where $C_{M1}=C_N+T_{M1}*(C_N-C_{N-1})/(T_N-T_{N-1})$, and generating fourth confirmation information when the first predicted concentration $C_{M1}$ is greater than a third concentration threshold $C_{ref3}$, wherein the third concentration threshold $C_{ref3}$ is greater than the first concentration threshold $C_{ref1}$;

when N is greater than 2, calculating a second predicted concentration $C_{M2}$ after a second predicted time length $T_{M2}$ where $C_{M2}=C_N+T_{M2}*(C_N-C_{N-1})/(T_N-T_{N-1})$, and calculating a second concentration change rate $V_{N-1,N-2}$ and comparing the first concentration change rate $V_{N,N-1}$ with the second concentration change rate $V_{N-1,N-2}$, where $V_{N-1,N-2}=(C_{N-1}-C_{N-2})/(T_{N-1}-T_{N-2})$, and generating fifth confirmation information when the second predicted concentration $C_{M2}$ is greater than a fourth concentration threshold $C_{ref4}$, and the first concentration change rate $V_{N,N-1}$ is greater than the second concentration change rate $V_{N-1,N-2}$, wherein the fourth concentration threshold $C_{ref4}$ is greater than the first concentration threshold $C_{ref1}$, and the second predicted time length $T_{M2}$ is greater than the first predicted time length $T_{M1}$; and determining that the risk level of pathological jaundice is a medium risk according to the first negative information, the second negative information and the third negative information, and according to the fourth confirmation information or the fifth confirmation information rate $V_{N,N-1}$ is greater than the second concentration change rate $V_{N-1,N-2}$, wherein the fourth concentration threshold $C_{ref4}$ is greater than the first concentration threshold $C_{ref1}$, and the second predicted time length $T_{M2}$ is greater than the first predicted time length $T_{M1}$; and determining that the risk level of pathological jaundice is a medium risk according to the first negative information, the second negative information and the third negative information, and according to the fourth confirmation information or the fifth confirmation information.

3. The non-transitory computer-readable storage medium according to claim 2, wherein the evaluating the risk level of pathological jaundice according to the detection data further comprises:

generating fourth negative information when the first predicted concentration $C_{M1}$ is not greater than the third concentration threshold $C_{ref3}$;

generating fifth negative information when the second predicted concentration $C_{M2}$ is not greater than the fourth concentration threshold $C_{ref4}$, or the first concentration change rate $V_{N,N-1}$ is not greater than the second concentration change rate $V_{N-1,N-2}$; and determining the risk level of pathological jaundice is a low risk according to the first negative information, the second negative information, the third negative information, the fourth negative information and the fifth negative information.

4. The non-transitory computer-readable storage medium according to claim 1, wherein the applied phototherapy parameter is a phototherapy parameter of a previous phototherapy, and wherein the calculating the recommended phototherapy parameter according to the detection data and the applied phototherapy parameter comprises:

calculating a characteristic value of phototherapy effect $C_{N,P}$ according to the detection data $(T_p, C_p)$ generated before start of the previous phototherapy and the detection data (TN, CN) generated before start of a current phototherapy, where $C_{N,P}=C_N-C_P$, and wherein an interval between $T_N$ and $T_p$ is 20-28 hours, and P is a natural number and less than N;

determining a phototherapy parameter adjustment strategy according to the characteristic value of phototherapy effect $C_{N,P}$ and the bilirubin concentration $C_N$; and determining the recommended phototherapy parameter for the current phototherapy according to the phototherapy parameter adjustment strategy and the phototherapy parameter of the previous phototherapy.

5. A system for diagnosing and treating jaundice, comprising:

a processor; and a memory, configured to store an executable program of the processor;

wherein the processor is configured to execute the executable program to cause the system to implement the following operations:

detecting a bilirubin concentration of a newborn;

generating detection data according to the detected bilirubin concentration;

evaluating a risk level of pathological jaundice according to the detection data; and displaying the detection data and/or the risk level of pathological jaundice, wherein the processor is further configured to execute the executable program to implement the following operations:

receiving a phototherapy parameter that has been applied to the newborn;

calculating a recommended phototherapy parameter according to the detection data and the applied phototherapy parameter;

displaying the recommended phototherapy parameter; and performing illumination according to the recommended phototherapy parameter, wherein evaluating the risk level of pathological jaundice according to the detection data comprises:

acquiring a birth time $T_B$ of the newborn, information on whether the newborn is full-term, and the detection data $(T_i, C_i)$ of the newborn, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection;

according to the detection data $(T_N, C_N)$, determining whether an interval time $T_{N,B}$ between a detection time $T_N$ and the birth time $T_B$ is less than a first time threshold $T_{ref1}$, and determining whether the bilirubin concentration Cv is greater than a first concentration threshold Creft, and generating first confirmation information when it is determined that the interval time $T_{N,B}$ is less than the first time threshold $T_{ref1}$ and the bilirubin concentration $C_N$ is greater than the first concentration threshold $C_{ref1}$;

determining whether the bilirubin concentration $C_N$ is greater than a second concentration threshold $C_{ref2}$ which is greater than the first concentration threshold $C_{ref1}$ according to the detection data $(T_N, C_N)$, wherein, when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, the first reference concentration $C_{ref21}$ is less than the second reference concentration $C_{ref22}$, and generating second confirmation information when it is determined that the bilirubin concentration $C_N$ is greater than the second concentration threshold $C_{ref2}$;

calculating a first concentration change rate $V_{N,N-1}$ according to the detection data $(T_N, C_N)$ and the detection data $(T_{N-1}, C_{N-1})$ when N is greater than 1, where, $V_{N,N-1}=(C_N-C_{N-1})/(T_N-T_{N-1})$, and generating third confirmation information when the first concentration change rate $V_{N,N-1}$ is greater than a reference rate threshold $V_{ref1}$; and determining that the risk level of pathological jaundice is a high risk according to the first confirmation information, the second confirmation information or the third confirmation information.

6. The system for diagnosing and treating jaundice according to claim 5, wherein the processor is further configured to execute the executable program to use the system to implement the following operations:

generating first negative information when the interval time $T_{N,B}$ is not less than the first time threshold $T_{ref1}$ or the bilirubin concentration $C_N$ is not greater than the first concentration threshold $C_{ref1}$;

generating second negative information when the bilirubin concentration $C_N$ is not greater than the second concentration threshold $C_{ref2}$;

generating third negative information when the first concentration change rate $V_{N,N-1}$ is not greater than the reference rate threshold $V_{ref1}$;

calculating a first predicted concentration $C_{M1}$ after a first predicted time length $T_{M1}$ when N is greater than 1, where $C_{M1}=C_N+T_{M1}*(C_N-C_{N-1})/(T_N-T_{N-1})$, and generating fourth confirmation information when the first predicted concentration $C_{M1}$ is greater than a third concentration threshold $C_{ref3}$, wherein the third concentration threshold $C_{ref3}$ is greater than the first concentration threshold $C_{ref1}$;

when N is greater than 2, calculating a second predicted concentration $C_{M2}$ after a second predicted time length $T_{M2}$ where $C_{M2}=C_N+T_{M2}*(C_N-C_{N-1})/(T_N-T_{N-1})$, and calculating a second concentration change rate $V_{N-1,N-2}$ and comparing the first concentration change rate $V_{N,N-1}$ with the second concentration change rate $V_{N-1,N-2}$, where $V_{N-1,N-2}=(C_{N-1}-C_{N-2})/(T_{N-1}-T_{N-2})$, and generating fifth confirmation information when the second predicted concentration $C_{M2}$ is greater than a fourth concentration threshold $C_{ref4}$, and the first concentration change rate $V_{N,N-1}$ is greater than the second concentration change rate $V_{N-1,N-2}$, wherein the fourth concentration threshold $C_{ref4}$ is greater than the first concentration threshold $C_{ref1}$, and the second predicted time length $T_{M2}$ is greater than the first predicted time length $T_{M1}$; and determining that the risk level of pathological jaundice is a medium risk according to the first negative information, the second negative information and the third negative information, and according to the fourth confirmation information or the fifth confirmation information.

7. The system for diagnosing and treating jaundice according to claim 6, wherein the processor is further configured to execute the executable program to cause the system to implement the following operations:

generating fourth negative information when the first predicted concentration $C_{M1}$ is not greater than the third concentration threshold $C_{ref3}$;

generating fifth negative information when the second predicted concentration $C_{M2}$ is not greater than the fourth concentration threshold $C_{ref4}$, or the first concentration change rate $V_{N,N-1}$ is not greater than the second concentration change rate $V_{N-1,N-2}$; and determining the risk level of pathological jaundice is a low risk according to the first negative information, the second negative information, the third negative information, the fourth negative information and the fifth negative information.

8. The system for diagnosing and treating jaundice according to claim 5, wherein the applied phototherapy parameter is a phototherapy parameter of a previous phototherapy, and wherein the processor is further configured to execute the executable program to cause the system to implement the following operations:

calculating a characteristic value of phototherapy effect $C_{N,P}$ according to the detection data $(T_P, C_P)$ generated before start of the previous phototherapy and the detection data $(T_N, C_N)$ generated before start of a current phototherapy, where $C_{N,P} = C_N - C_P$, and wherein an interval between $T_N$ and $T_P$ is 20-28 hours, and P is a natural number and less than N;

determining a phototherapy parameter adjustment strategy according to the characteristic value of phototherapy effect $C_{N,P}$ and the bilirubin concentration $C_N$; and determining the recommended phototherapy parameter for the current phototherapy according to the phototherapy parameter adjustment strategy and the phototherapy parameter of the previous phototherapy.

9. The system for diagnosing and treating jaundice according to claim 8, wherein the determining a phototherapy parameter adjustment strategy according to the characteristic value of phototherapy effect $C_{N,P}$ and the bilirubin concentration $C_N$ comprises:

determining a previous phototherapy effect level according to the characteristic value of phototherapy effect $C_{N,P}$;

determining a current jaundice level according to the bilirubin concentration $C_N$; and determining the phototherapy parameter adjustment strategy according to the previous phototherapy effect level, the current jaundice level and a phototherapy parameter adjustment strategy mapping table, wherein the phototherapy parameter adjustment strategy mapping table has a phototherapy parameter adjustment strategy corresponding to both a phototherapy effect level and a jaundice level.

10. A computer implemented method for diagnosing and treating jaundice, comprising:

detecting a bilirubin concentration of a newborn;

generating detection data according to the detected bilirubin concentration;

evaluating a risk level of pathological jaundice according to the detection data; and displaying the detection data and/or the risk level of pathological jaundice, wherein the computer-implemented method further comprises:

receiving a phototherapy parameter that has been applied to the newborn;

calculating a recommended phototherapy parameter according to the detection data and the applied phototherapy parameter;

displaying the recommended phototherapy parameter; and performing illumination according to the recommended phototherapy parameter, wherein the evaluating the risk level of pathological jaundice according to the detection data comprises:

acquiring a birth time $T_B$ of the newborn, information on whether the newborn is full-term, and the detection data $(T_i, C_i)$ of the newborn, where i is a natural number and is not greater than N, and is used to represent i-th bilirubin detection performed for the newborn; N represents N-th bilirubin detection latest performed for the newborn; $T_i$ represents a time of the i-th bilirubin detection, and $C_i$ represents a bilirubin concentration of the i-th bilirubin detection;

according to the detection data $(T_N, C_N)$, determining whether an interval time $T_{N,B}$ between a detection time $T_N$ and the birth time $T_B$ is less than a first time threshold $T_{ref1}$, and determining whether the bilirubin concentration $C_N$ is greater than a first concentration threshold $C_{ref1}$, and generating first confirmation information when it is determined that the interval time $T_{N,B}$ is less than the first time threshold $T_{ref1}$ and the bilirubin concentration $C_N$ is greater than the first concentration threshold $C_{ref1}$;

determining whether the bilirubin concentration $C_N$ is greater than a second concentration threshold $C_{ref2}$ which is greater than the first concentration threshold $C_{ref1}$ according to the detection data $(T_N, C_N)$, wherein, when the newborn is full-term, the second concentration threshold $C_{ref2}$ is equal to a first reference concentration $C_{ref21}$, and when the newborn is not full-term, the second concentration threshold $C_{ref2}$ is equal to a second reference concentration $C_{ref22}$, the first reference concentration $C_{ref21}$ is less than the second reference concentration $C_{ref22}$, and generating second confirmation information when it is determined that the bilirubin concentration $C_N$ is greater than the second concentration threshold $C_{ref2}$;

calculating a first concentration change rate $V_{N,N-1}$ according to the detection data $(T_N, C_N)$ and the detection data $(T_{N-1}, C_{N-1})$ when N is greater than 1, where, $V_{N,N-1} = (C_N - C_{N-1})/(T_N - T_{N-1})$, and generating third confirmation information when the first concentration change rate $V_{N,N-1}$ is greater than a reference rate threshold $V_{ref1}$; and determining that the risk level of pathological jaundice is a high risk according to the first confirmation information, the second confirmation information or the third confirmation information.

11. The computer-implemented method according to claim 10, wherein the evaluating the risk level of pathological jaundice according to the detection data further comprises:

generating first negative information when the interval time $T_{N,B}$ is not less than the first time threshold $T_{ref1}$ or the bilirubin concentration $C_N$ is not greater than the first concentration threshold $C_{ref1}$;

generating second negative information when the bilirubin concentration $C_N$ is not greater than the second concentration threshold $C_{ref2}$;

generating third negative information when the first concentration change rate $V_{N,N-1}$ is not greater than the reference rate threshold $V_{ref1}$;

calculating a first predicted concentration $C_{M1}$ after a first predicted time length $T_{M1}$ when N is greater than 1, where $C_{M1}=C_N+T_{M1}*(C_N-C_{N-1})/(T_N-T_{N-1})$, and generating fourth confirmation information when the first predicted concentration $C_{M1}$ is greater than a third concentration threshold $C_{ref3}$, wherein the third concentration threshold $C_{ref3}$ is greater than the first concentration threshold $C_{ref1}$;

when N is greater than 2, calculating a second predicted concentration $C_{M2}$ after a second predicted time length $T_{M2}$ where $C_{M2}=C_N+T_{M2}*(C_N-C_{N-1})/(T_N-T_{N-1})$, and calculating a second concentration change rate $V_{N-1,N-2}$ and comparing the first concentration change rate $V_{N,N-1}$ with the second concentration change rate $V_{N-1,N\_2}$, where $V_{N-1,N\_2}=(C_{N-1}-C_{N-2})/(T_{N-1}-T_{N-2})$, and generating fifth confirmation information when the second predicted concentration $C_{M2}$ is greater than a fourth concentration threshold $C_{ref4}$, and the first concentration change rate $V_{N,N-1}$ is greater than the second concentration change rate $V_{N-1,N\_2}$, wherein the fourth concentration threshold $C_{ref4}$ is greater than the first concentration threshold $C_{ref1}$, and the second predicted time length $T_{M2}$ is greater than the first predicted time length $T_{M1}$; and determining that the risk level of pathological jaundice is a medium risk according to the first negative information, the second negative information and the third negative information, and according to the fourth confirmation information or the fifth confirmation information.

12. The computer-implemented method according to claim 11, wherein the evaluating the risk level of pathological jaundice according to the detection data further comprises:

generating fourth negative information when the first predicted concentration $C_{m1}$ is not greater than the third concentration threshold $C_{ref3}$;

generating fifth negative information when the second predicted concentration $C_{M2}$ is not greater than the fourth concentration threshold $C_{ref4}$, or the first concentration change rate $V_{N,N-1}$ is not greater than the second concentration change rate $V_{N-1,N-2}$; and determining the risk level of pathological jaundice is a low risk according to the first negative information, the second negative information, the third negative information, the fourth negative information and the fifth negative information.

13. The computer-implemented method according to claim 10, wherein the applied phototherapy parameter is a phototherapy parameter of a previous phototherapy, and wherein the calculating the recommended phototherapy parameter according to the detection data and the applied phototherapy parameter comprises:

calculating a characteristic value of phototherapy effect $C_{N,\,P}$ according to the detection data $(T_P, C_P)$ generated before start of the previous phototherapy and the detection data $(T_N, C_N)$ generated before start of a current phototherapy, where $C_{N,\,P}=C_N-C_P$, and wherein an interval between $T_N$ and $T_P$ is 20-28 hours, and P is a natural number and less than N;

determining a phototherapy parameter adjustment strategy according to the characteristic value of phototherapy effect $C_{N,\,P}$ and the bilirubin concentration $C_N$;

and determining the recommended phototherapy parameter for the current phototherapy according to the phototherapy parameter adjustment strategy and the phototherapy parameter of the previous phototherapy.

* * * * *